United States Patent
Terry

(10) Patent No.: US 10,630,708 B2
(45) Date of Patent: Apr. 21, 2020

(54) EMBEDDED DEVICE AND METHOD OF PROCESSING NETWORK COMMUNICATION DATA

(71) Applicant: Cyber Detection Services Inc, Old Hickory, TN (US)

(72) Inventor: Robert Terry, Old Hickory, TN (US)

(*) Notice: Subject to any disclaimer, the term of this patent is extended or adjusted under 35 U.S.C. 154(b) by 212 days.

(21) Appl. No.: 15/400,569

(22) Filed: Jan. 6, 2017

(65) Prior Publication Data

US 2017/0201543 A1 Jul. 13, 2017

Related U.S. Application Data

(60) Provisional application No. 62/276,617, filed on Jan. 8, 2016.

(51) Int. Cl.
*H04L 29/06* (2006.01)
*G06F 11/30* (2006.01)

(52) U.S. Cl.
CPC ...... *H04L 63/1425* (2013.01); *H04L 63/1441* (2013.01); *H04L 63/0227* (2013.01)

(58) Field of Classification Search
CPC ............. H04L 63/0227; H04L 63/1425; H04L 63/1441
See application file for complete search history.

(56) References Cited

U.S. PATENT DOCUMENTS

| | | | | |
|---|---|---|---|---|
| 7,263,561 B1* | 8/2007 | Green | ..................... | G06F 21/56 709/206 |
| 7,305,708 B2* | 12/2007 | Norton | ................ | H04L 63/0227 713/151 |
| 7,694,115 B1* | 4/2010 | Porras | ................... | H04L 41/142 340/506 |
| 8,601,064 B1* | 12/2013 | Liao | ....................... | H04L 51/12 709/206 |

(Continued)

OTHER PUBLICATIONS

Baykara, Muhammet, and Resul Das. "A survey on potential applications of honeypot technology in intrusion detection systems." International Journal of Computer Networks and Applications (IJCNA) 2.5 (2015): 203-208. (Year: 2015).*

*Primary Examiner* — Michael Simitoski
(74) *Attorney, Agent, or Firm* — John L. Sotomayor

(57) ABSTRACT

Disclosed is an embedded device configured to process network communication data received over a communication network. The embedded device may include a communication interface configured to receive the network communication data from at least one external device connected to the communication network. Further, the embedded device may be configured to transmit a benign format of the network communication data to at least one designated network device connected to the communication network. Additionally, the embedded device may include a memory configured to store the network communication data. Further, the embedded device may include a processor configured to analyze the network communication data. Further- (Continued)

more, the processor may be configured to detect malicious activity associated with the network communication data based on the analyzing. Moreover, the processor may be configured to convert the network communication data into the benign format of the network communication data.

20 Claims, 7 Drawing Sheets

(56) References Cited

U.S. PATENT DOCUMENTS

| | | | | |
|---|---|---|---|---|
| 9,032,522 | B1* | 5/2015 | Mulder | G06F 21/552 726/23 |
| 9,392,017 | B2* | 7/2016 | Cui | H04L 63/145 |
| 2001/0039579 | A1* | 11/2001 | Trcka | G06F 21/552 709/224 |
| 2003/0233583 | A1* | 12/2003 | Carley | H04L 41/0246 726/3 |
| 2004/0044912 | A1* | 3/2004 | Connary | H04L 43/045 726/23 |
| 2004/0162994 | A1* | 8/2004 | Cohen | H04L 63/0227 726/22 |
| 2004/0250124 | A1* | 12/2004 | Chesla | G06F 21/552 726/13 |
| 2005/0166072 | A1* | 7/2005 | Converse | H04L 63/1441 726/5 |
| 2006/0037080 | A1* | 2/2006 | Maloof | G06F 21/562 726/24 |
| 2007/0147239 | A1* | 6/2007 | Wu | H04L 63/145 370/230 |
| 2007/0271457 | A1* | 11/2007 | Patil | G06F 21/554 713/166 |
| 2008/0046989 | A1* | 2/2008 | Wahl | G06F 21/55 726/7 |
| 2008/0047012 | A1* | 2/2008 | Rubin | G06F 21/552 726/23 |
| 2008/0060074 | A1* | 3/2008 | Okuyama | H04L 63/1441 726/23 |
| 2008/0098476 | A1* | 4/2008 | Syversen | H04L 63/0227 726/23 |
| 2012/0023572 | A1* | 1/2012 | Williams, Jr. | G06F 21/552 726/13 |
| 2012/0198541 | A1* | 8/2012 | Reeves | H04L 63/0227 726/13 |
| 2013/0094376 | A1* | 4/2013 | Reeves | H04L 43/18 370/252 |
| 2013/0276118 | A1* | 10/2013 | Kashyap | H04L 63/145 726/24 |
| 2014/0096229 | A1* | 4/2014 | Burns | H04L 63/1491 726/15 |
| 2015/0047032 | A1* | 2/2015 | Hannis | H04L 63/1416 726/23 |
| 2015/0101048 | A1* | 4/2015 | Sridhara | G06F 21/55 726/23 |
| 2015/0139236 | A1* | 5/2015 | Chadda | H04L 63/0227 370/392 |
| 2015/0222652 | A1* | 8/2015 | Ramsey | H04L 63/1416 726/23 |
| 2016/0248788 | A1* | 8/2016 | Saito | H04L 63/1416 |
| 2016/0261618 | A1* | 9/2016 | Koshelev | G06F 16/285 |
| 2017/0279852 | A1* | 9/2017 | Drummond | H04W 12/1201 |
| 2018/0293381 | A1* | 10/2018 | Tseng | G06F 21/566 |

* cited by examiner

EMBEDDED DEVICE AND METHOD OF PROCESSING NETWORK COMMUNICATION DATA

The current application claims a priority to the U.S. Provisional Patent application Ser. No. 62/276,617 filed on Jan. 8, 2016.

FIELD OF THE INVENTION

The present disclosure generally relates to digital data processing. More specifically, the present disclosure relates to methods, devices and apparatus for processing network communication data in order to detect malicious activities.

BACKGROUND OF THE INVENTION

Over the past 10 years networks have become much more complex. The introduction of the Open Source Initiative (OSI) has provided a world-wide platform for developers to design computer programs (source code), post those computer programs (referred to as "open source") on the Internet, and allow any person or organization to download the programs (source code), utilize the programs for personal or professional use and also contribute to advancing the technical capabilities of the programs (source code), for any person or organization to download from the Internet and utilize at any time.

Major corporations and government organizations worldwide now contribute to the OSI in the field of cybersecurity. Specifically, OSI technology (source code) is available to allow network administrators to "test" the security of their networks to find unknown weaknesses or vulnerabilities that may exist in networks. The OSI technology (source code) within the specific area of Network Administrative/Security Tools have become so advanced, the technology allows an administrator to specifically target a device, a group of devices by entering an IP address range, an entire network or search the Internet for weaknesses or vulnerabilities that may exist in a device connected to the Internet.

These Network Administrative/Security Tools (hereafter referred to as "tools"), have the capability to transmit to "targets" (may consist of a device, group of devices, network or networks), and the communications perform an analysis on the target's currently executing processes (program applications), which reside in the memory of the targeted device. These tools are so powerful, the communications have the capability of extracting critical/confidential information from a targeted device and often allow an administrator to successfully penetrate, exploit and/or gain control of a targeted device without the requirement of installing a physical file or physically altering the targeted device.

Hackers, hacking organizations and state sponsored hacking organizations have been downloading such source code to these tools, increasing/enhancing their capabilities, repackaging, reconfiguring (recompiling and linking) and utilizing the tools, releasing these tools to the public for free or for a substantial profit to successfully target, attack and penetrate devices/networks world-wide, leaving no trace whatsoever that an actual cyber attack was successfully executed against a targeted network/device.

Another major world-wide problem is that over the past 10 years cybersecurity experts have developed technology (algorithms) that can successfully probe the world-wide Internet to detect, record and map the whereabouts of cyber defense Internet sensors, which are designed to detect a source (attacking program/tool) attempting to gain access and penetrate a targeted device/network the Internet sensor is monitoring. These Internet sensors have established (defined) policies to determine if a source attempting to communicate (connect) and obtain access to a target is legitimate or malicious activity. If the Internet sensor detects the source and it fails the defined policy, the source is denied access and an alert is transmitted on the source IP address attempting to connect and gain access to the targeted device or network.

These Internet sensors working together comprise corporate, national and world-wide "detection nets" that also act as an "early warnings and indications system" that will allow all networks participating within the "detection net" to defend themselves against a source that has been identified as malicious by an Internet sensor. However, a problem with Internet sensors is that the defined policy is the only mechanism that determines if a source is malicious activity, which produces a large number of "false positives". There is no automated analysis of the actual communications payload to determine the true intent of a source connecting to a targeted network/device. The Internet sensor determines if the activity (connection) is legitimate or malicious based on a "pass or fail" of the defined policy that determines if device/network access should be granted to the source.

Since 2005, studies (specifications) have been published that allow hackers to perform a reconnaissance and determine the whereabouts of Internet sensors and map their physical IP address locations before they execute an actual cyber attack. This provides hackers the capabilities to automatically bypass Internet sensors/"detection nets" at the time a cyber attack is launched (executed).

Another major world-wide problem is how industrial Programmable Logic Controllers (PLCs) have been, and are still being designed and deployed. PLCs are commonly configured with standard communications protocols such as Telnet, SecureShell (SSH), web/Internet browser access, etc., to allow remote access and management from an external device.

PLCs often utilize standard communication protocols on IANA reserved ports defined for a specific use, such as port 21-File Transfer Protocol, port 22-SecureShell, port 23-Telnet, port 80-World Wide Web/web browser, port 443-Secure World Wide Web, etc.

As an example, many PLCs world-wide are often specifically configured to allow remote access and 100% remote management (control) through reserved IANA port 23-Telnet. Hackers world-wide educated in industrial PLCs will configure their tools to search the US and/or world-wide Internet for devices that will respond to port 23 Telnet commands.

Another problem is with legitimate remote access entry points to devices and/or networks, within both traditional and cloud networks. Commercial corporations and government organizations world-wide utilize commercial "off the shelf" remote access software (hereafter referred to as "login technology") that allows an individual to connect to a network/device, enter a system name, password, etc. to obtain access to the network/device. Network defense systems commonly do not track sources attempting to gain access to networks via remote access entry points, and leave the login technology to successfully manage all login/unauthorized attempts. Because network defense systems commonly do not track many aspects of login technology activity, many Internet sensors do not track and alert "detection nets" that a source has attempted unauthorized access to a network. Because this activity is not tracked by many network defense systems, successful unauthorized login activity is not detected and therefore lateral movements within and throughout compromised networks is extremely difficult to detect.

With the introduction of Cloud virtualization technology, the requirement for increased bandwidth has substantially grown in order to maintain a stable "Cloud environment" network. The average bandwidth to maintain a Cloud instance communicating to a Cloud platform is 80 kilobytes per second (80 kbps), per user. This equates to approximately 10,000 bytes per second, per user.

As an example, a Cloud network with 10 users will require an average minimum bandwidth that exceeds 100,000 bytes per second to adequately maintain the network. Hackers utilizing attack tools may launch attacks that can successfully exploit/compromise a Cloud network with less than 150 bytes of malicious code that resides in the process buffers/sockets (memory). This presents an extremely difficult problem for network defense systems defending cloud networks to monitor, detect and stop malicious code without seriously affecting (degrading) the performance of the targeted cloud network.

Another problem with Cloud (Virtualization) networks is that specifications have been widely published to determine if a device is an actual computer or a virtual instance. Malicious code can determine if the target is a virtual instance and not execute its malicious code until it successfully reaches an actual (real) computer and determines the environment is suitable to execute against the target.

Over the past ten years, hackers have been continuously refining their skills and publishing methods on how to successfully detect fixed static network defense systems, and bypass (circumvent) those network defense systems to gain access to a targeted network, or confuse the network defense system by transmitting "fragmented" communications that trick and bypass network defense policies.

As an example, a hacker utilizing an attack tool might successfully detect the location (IP address) of a targeted network's internal firewall and/or intrusion detection system by utilizing a method as simple as transmitting ICMP communications. As a general rule, well secured networks normally disable outbound ICMP and many times attack tools can determine exactly where ICMP stops (is disabled) when performing a reconnaissance or probing a network. Hackers many times might correctly assume that where ICMP stops (is disabled) is where the network firewall, intrusion detection system (network defense assets), etc. are physically installed.

Whatever method is utilized to successfully detect fixed static network defense systems, will provide the exact IP addresses on where these defense assets reside, and the hacker will then attempt to bypass (circumvent) or confuse the defense systems with "fragmented" communications.

Honeypots and sinkholes are considered very strong instruments in detecting cyber attacks and in performing an analysis of cyber attacks. However, algorithms have been published to successfully detect and map the world-wide whereabouts of all honeypots and sinkholes. In respect to Cloud computing, virtual honeypots and virtual sinkholes can be instantly detected due to the overhead (environment variables) required in virtual computing.

SUMMARY

Disclosed is an embedded device configured to process network communication data received over a communication network. The embedded device may include a communication interface configured to receive the network communication data from at least one external device connected to the communication network. Further, the embedded device may be configured to transmit a benign format of the network communication data to at least one designated network device connected to the communication network. Additionally, the embedded device may include a memory configured to store the network communication data. Further, the embedded device may include a processor configured to analyze the network communication data. Furthermore, the processor may be configured to detect malicious activity associated with the network communication data based on the analyzing. Moreover, the processor may be configured to convert the network communication data into the benign format of the network communication data.

Further disclosed is a method of processing network communication data received over a communication network using the embedded device. The method may include receiving, using the communication interface, the network communication data from at least one external device connected to the communication network. Further, the method may include analyzing, using the processor, the network communication data. Further, the method may include detecting, using the processor, malicious activity associated with the network communication data based on the analyzing. Further, the method may include converting, using the processor, the network communication data into the benign format of the network communication data. Further, the method may include transmitting, using the communication interface, a benign format of the network communication data to at least one designated network device connected to the communication network.

DETAILED DESCRIPTION OF THE INVENTION

Figure 1:
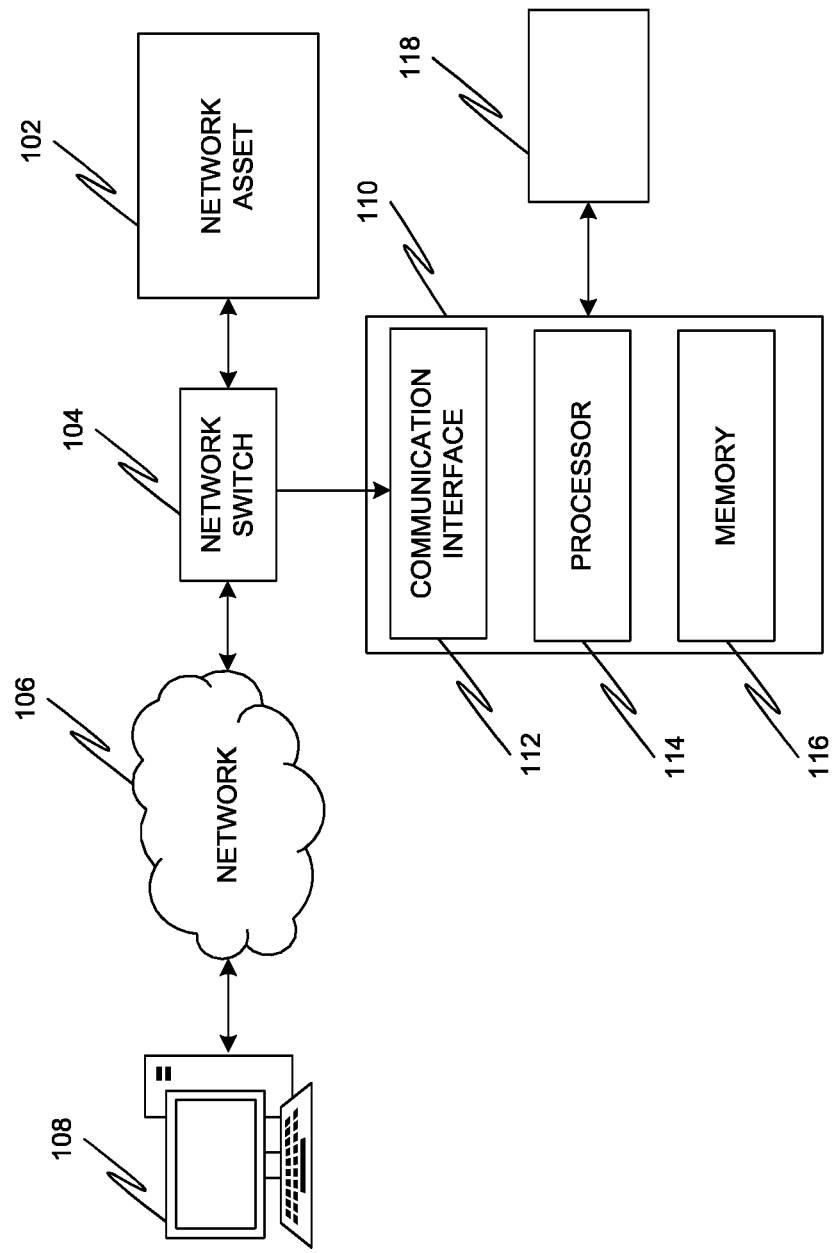
FIG. 1 illustrates an operational environment comprising an embedded device configured to process network communication data associated with a network asset such as, for example, but not limited to, a network server, in accordance with various embodiments disclosed herein.

All descriptions are for the purpose of showing selected versions of the present invention and are not intended to limit the scope of the present invention.

Non-limiting and non-exhaustive embodiments of the present invention are described with reference to the preceding figures, wherein like reference numerals refer to like parts throughout the various views unless otherwise precisely specified.

In the description herein, general details of the present invention are provided in flow diagrams to provide a general understanding of the programming methods that will assist in an understanding of embodiments of the present invention. One skilled in the relevant art of programming will recognize, however, that the present invention can be practiced without one or more specific details, or in other programming methods. Referenced throughout this specification to "one embodiment" or "an embodiment" means that a particular feature, structure or characteristic described in connection with the embodiment is included in at least one embodiment of the present invention. Thus, the appearance of the phrases "in one embodiment" or "in an embodiment" in places throughout this specification are not necessarily all referring to the same embodiment. Furthermore, the particular features, structures, or characteristics may be combined in any suitable manner in one or more embodiments.

FIG. 1 illustrates an operational environment 100 comprising a network asset 102, such as, for example, but not limited to, one or more of a network server, a network switch, a network router, a network gateway, a network hub, a Local Area Network (LAN), a Wide Area Network (WAN). Accordingly, the network asset 102 may be interfaced with a network switch 104 configured to provide connectivity with a network 106 such as the Internet. Further, one or more external devices, such as external device 108 may be configured to communicate with the network asset 102 through the network 106.

In order to provide security, the operational environment 100 may further include an embedded device 110 configured to receive network communication data from the one or more external devices. Accordingly, the embedded device 110 may include a communication interface 112 configured to communicate with the network switch 104. Further, the embedded device 110 may be installed in parallel to a network defense system associated with the network asset 102, such as, for example, a LAN. Further, the network defense system may be configured to defend the network asset 102 against malicious network communication. For example, the network defense system may include a firewall configured to monitor network communication data received and/or transmitted by the network asset 102.

In some embodiments, the embedded device 110 may be installed in relation to the network asset 102 in such a way that it appears as an alternative entry point to penetrate the network asset 102 while circumventing the network defense system associated with the network asset 102. Accordingly, the embedded device 110 may be associated with a unique network address, such as, for example, a static public IP address.

As an example, the network asset 102 may include one or more network servers constituting the perimeter of a LAN. Further, each of the one or more network servers may include the network defense system. Further, malicious network communication data originating from the one or more external devices, such as external device 108 may be filtered by the network asset.

Accordingly, in an instance, the embedded device 110 may be installed outside the LAN and external to the main network traffic ingress of the LAN. Further, the embedded device 110 may be in parallel to the network defense systems of the network asset 102. As a result, the embedded device 110 may appear to the one or more external devices as an extension of the LAN. Further, the embedded device 110 may be configured to appear as a real network device, such as, but not limited to, a network server, a network switch, a network router, a network gateway and a network hub associated with the LAN. Accordingly, the embedded device 110 may deceptively present itself as an alternative entry point to the LAN. Consequently, a malicious user operating the external device 108 and/or a malicious bot executing thereupon may determine the embedded device 110 to be a vulnerable entry point to the LAN for launching a cyber attack and/or gaining unauthorized access to the LAN.

Accordingly, in order to communicate with the one or more external devices, in some embodiments, the communication interface 112 may include a plurality of communication ports. Further, each of the plurality of communication ports may be set to an enabled state. Accordingly, the external device 108 performing a malicious activity such as reconnaissance carried out prior to and/or as part of a cyber attack may determine that the communication interface 112 is receptive to communication on each port set to the enabled state. Accordingly, the embedded device 110 may be configured to capture communication originating from each of a plurality of external devices targeting different communication ports.

In some embodiments, at least one communication port of the plurality of communication ports may be configured to appear as a remote management port. In general, a remote management port associated with a network asset is a port configured to allow one or more remote terminals to access and manage the network asset over a network, such as the network 106.

Figure 2:
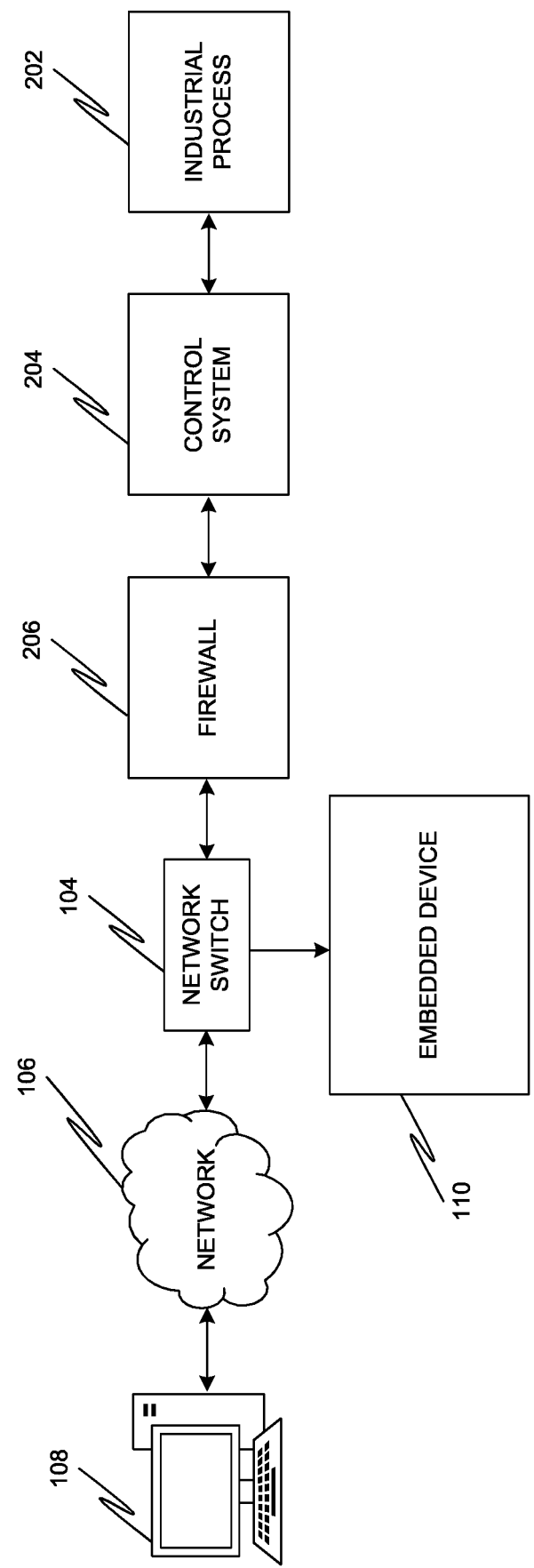
FIG. 2 illustrates an operational environment comprising an embedded device configured to process network communication data associated with a control system corresponding to an industrial process, in accordance with various embodiments disclosed herein.

Further, in some embodiments, at least one communication port of the plurality of communication ports may be configured to appear as a remote management port associated with a Programmable Logic Controller (PLC) as further explained in conjunction with FIG. 2.

In some embodiments, the communication interface 112 may be configured to transmit a response to the one or more external devices, such as external device 108. Further, the transmission of the response may be independent of maliciousness of the network communication data. In other words, the communication interface 112 may be configured to transmit the response even if the network communication data received from the external device 108 is malicious. Further, in some embodiments, the communication interface 112 may be configured to transmit predetermined responses according to one or more characteristics of the network communication data. The predetermined responses may be such that the response appears to originate from a legitimate network device. For example, a network device may be known to provide a predetermined response to a predetermined request. Accordingly, the communication interface 112 may emulate the network device by transmitting the predetermined responses. As a result, a malicious user operating the external device 108 and/or a malicious bot executing thereupon may be deceived into determining that the external device 108 is communicating with the network device. Further, since the response is received, the external device 108 and/or a bot executing thereupon may be deceived into determining that there is no filtering of the network communication data at the embedded device 110. In other words, since an Internet sensor does not provide responses to malicious requests, the embedded device 110 may not be determined as an Internet sensor by the external device 108.

Further, the embedded device 110 may include a processor 114 configured to analyze the network communication data received over the network 106. Furthermore, the processor 114 may be configured to detect malicious activity associated with the network communication data based on the analyzing. For instance, the external device 108 may be operated by a malicious user, such as a hacker, intending to indirectly gain unauthorized access to the network asset 102 through the embedded device 110. Accordingly, the network communication data may be specifically targeted towards the embedded device 110. For instance, the network communication data may be configured by the external device 108 to leverage known exploits associated with the embedded device 110.

Accordingly, the processor 114 may be configured to examine one or more characteristics of the network communication data to detect the malicious activity. For example, a source network address embedded in the data packets comprised in the network communication data may be compared to a predetermined list of authorized and/or unauthorized network addresses. As another example, the one or more characteristics may include a frequency and/or a duration of the network communication data transmitted by the external device 108. Additionally, and/or alternatively, contents of the data packets may be decoded and compared against predetermined signatures of malicious network communication data.

Moreover, the processor 114 may be configured to convert the network communication data into a benign format of the network communication data. The benign format of the network communication data in general refers to any form that allows the network communication data to be transmitted and/or displayed while preventing the network communication data from causing actions that are unfavorable to the security of the network asset 102 and/or any other electronic device processing the benign format of the network communication data. In some embodiments, the benign format of the network communication data may include hexadecimal format. Further, in some embodiments, the benign format of the network communication data may include a non-user friendly representation of the network communication data. Accordingly, in case the network communication data included a hyperlink to a malicious website, displaying of the network communication data may cause a user to click on the hyperlink and be led to the malicious website. However, displaying of the benign format of the network communication data may prevent such an action by the user, thus providing security.

Further, in some embodiments, the embedded device 110 may be configured to transmit the benign format of the network communication data to at least one designated network device, such as network device 118, that may in some embodiments, be connected to the communication network. Alternatively, in some embodiments, the network device 118 may be connected to the embedded device 110 over any other communication channel. For instance, the network device 118 may be operated by a security administrator associated with the network asset 102 who may be presented with the benign format of the network communication data for further analysis.

In some embodiments, the embedded device 110 may include a memory 116 configured to store the network communication data. For instance, the memory 116 may include process buffers and/or socket buffers corresponding to one or more network processes executing on the processor 114. The one or more network processes may be associated with one or more communication channels established between the one or more external devices and the embedded device 110. Accordingly, the network communication data may be stored in the process buffers and/or socket buffers comprised in the memory 116.

Further, in some embodiments, the processor 114 may be further configured to determine a plurality of frequencies of malicious activities corresponding to the one or more external devices. Accordingly, the memory 116 may be further configured to store the detection of malicious activity. For instance, the memory 116 may be configured to store an indicator of malicious activity in association with characteristics of the network communication data, such as, but not limited to, network address, machine address, domain name, subnet number etc. associated with the external device 108. Further, a time stamp corresponding to the malicious activity may be stored in the memory 116. Accordingly, the processor 114 may be configured to identify the indicator of malicious activity corresponding to multiple instances of malicious activity associated with the external device 108 in the past. Further, based on corresponding time stamps, the processor 114 may be configured to determine a frequency of malicious activity originating from the external device 108 over a period of time.

Further, the communication interface 112 may be configured to terminate communication with an external device of the one or more external devices, such as external device 108, based on a comparison between a frequency of the plurality of frequencies corresponding to the external device and other frequencies of the plurality of frequencies. Accordingly, an extent of the frequency of malicious activity associated with the external device in relation to the frequencies of malicious activities associated with other external devices may determine a level of security threat imposed by the external device.

Additionally, in some embodiments, the communication interface 112 may be configured to terminate communication with the external device 108 for a variable duration of time. In some embodiments, the variable duration of time may be based on a random number. Further, in some embodiments, the variable duration of time may range between a lower limit and an upper limit. Furthermore, one or more of the lower limit and the upper limit may be based on the random number. Accordingly, the processor 114 may be configured to generate the random number.

In some embodiments, the variable duration of time may be based on the frequency of malicious activity. For instance, the variable duration of time may be commensurate with the frequency of malicious activity. Accordingly, external devices associated with higher frequencies of malicious activities would be terminated for longer periods of time as compared to external devices associated with lower frequencies of malicious activities.

Due to termination of the communication, the external device 108 may not be able to communicate with the embedded device 110. However, subsequent to expiry of the variable duration of time, the external device 108 may be able to resume communication with the embedded device 110. Accordingly, while the embedded device 110 transmits responses to such communication from the external device 108, the embedded device 110 may appear as a legitimate network device and not an Internet sensor.

FIG. 2 illustrates an operational environment 200 comprising the embedded device 110 configured to process network communication data associated with an industrial process 202, in accordance with various embodiments disclosed herein. The industrial process 202 may in general represent any process controllable by an electronic control system. Accordingly, the operational environment may include a control system 204 configured to control the industrial process 202. The industrial process 202 may include one or more sensors for sensing variables and one or more actuators configured to perform actions. Further, in some embodiments, the control system 204 may be configured to control the one or more actuators based on inputs received from the one or more sensors according to one or more predefined control laws. For example, the control system 204 may include a Programmable Control Logic (PLC) controller embodying the predefined control laws in the form of a re-programmable memory. Accordingly, the predefined control laws may be subject to modification based on changing requirements of the industrial process 202. Further, the control system 204 may be configured to be remotely accessible in order to manage one or more of the control system 204 and the industrial process 202.

Further, to provide security against unauthorized access, the operational environment 200 may include a firewall 206 configured to monitor network communication data directed towards the control system 204. Accordingly, the firewall 206 may be installed along a communication path between the network switch 104 and the control system 204.

The network switch 104 may further be interfaced with the embedded device 110. Further, the embedded device 110 may be installed external to the main traffic ingress associated with the control system 204 and outside the firewall. Additionally, the embedded device 110 may be installed in parallel to the firewall, such that the embedded device 110 appears to the external device 108 as an alternative entry point to indirectly gain access to the control system 204 while circumventing the firewall 206.

Further, the operation of the embedded device 110 to process the network communication data specifically directed towards the embedded device 110 may be understood from the description in conjunction with FIG. 1.

Figure 3:
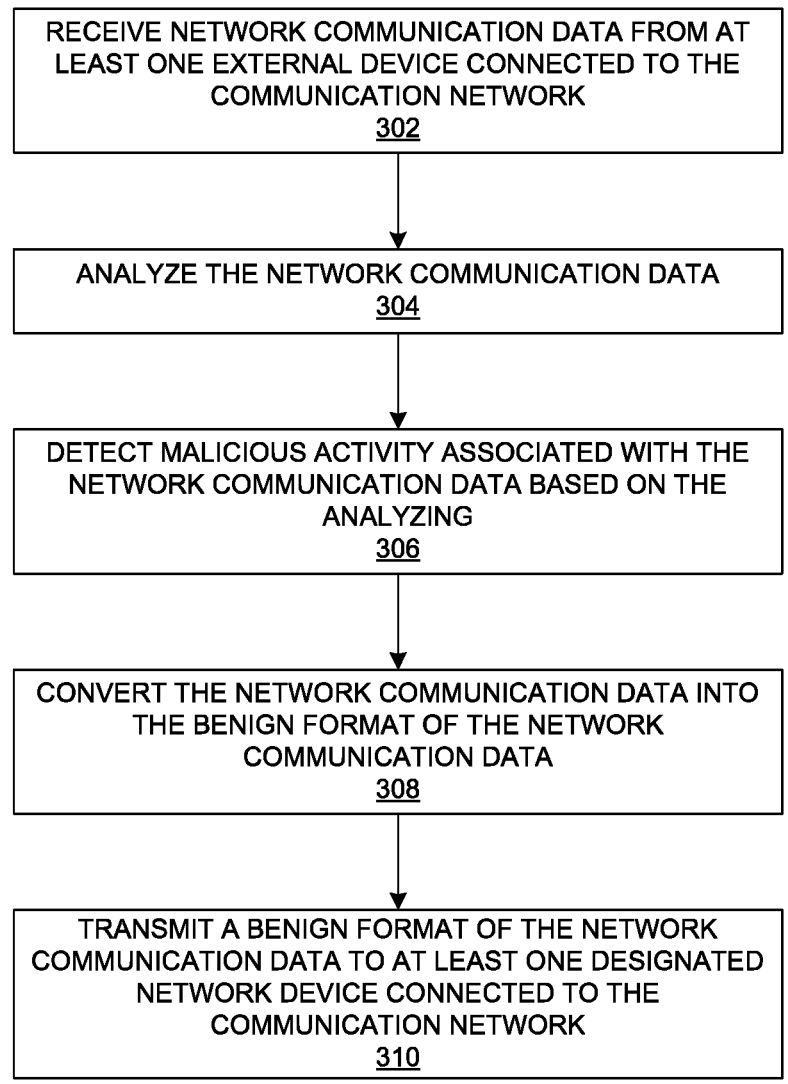
FIG. 3 illustrates a method of processing network communication data performable by the embedded device in accordance with some embodiments disclosed herein.

FIG. 3 illustrates a method of processing network communication data performable by the embedded device 110 in accordance with some embodiments disclosed herein. The network communication data may be received over a communication network, such as network 106 and specifically directed towards the embedded device 110. The method may include a step 302 of receiving, using the communication interface 112, the network communication data from the one or more external devices, such as external device 108, connected to the communication network, such as network 106. Further, the method may include a step 304 of analyzing, using the processor 114, the network communication data. Further, the method may include a step 306 of detecting, using the processor 114, malicious activity associated with the network communication data based on the analyzing. Further, the method may include a step 308 of converting, using the processor 114, the network communication data into the benign format of the network communication data. Further, the method may include a step 310 of transmitting, using the communication interface 112, a benign format of the network communication data to at least one designated network device, such as network device 118, connected to the communication network and/or the embedded device 110. In some embodiments, the benign format may include hexadecimal format.

In some embodiments, the method may further include a step of installing the embedded device 110 in parallel to the network defense system associated with the network asset 102. Further, the network defense system may be configured to defend the network server against malicious network communication. Accordingly, the step of installing the embedded device 110 external to the network asset 102 and in parallel to the network defense system may cause the embedded device 110 to appear as an alternative entry point for indirectly gaining unauthorized access to the network asset 102 while circumventing the network defense system.

In some embodiments, the communication interface 112 may include a plurality of communication ports. Additionally, the method further may include a step of setting each of the plurality of communication ports to an enabled state.

In some embodiments, the method may further include a step of configuring at least one communication port of the plurality of communication ports to appear as the remote management port.

In some embodiments, the communication interface 112 may include a plurality of communication ports. Additionally, the method may further include a step of configuring at least one communication port of the plurality of communication ports to appear as the remote management port associated with a Programmable Logic Controller (PLC).

In some embodiments, the method may further include a step of transmitting, using the communication interface 112, the response to the one or more external devices, such as the external device 108. Further, the transmitting of the response may be independent of maliciousness of the network communication data.

Figure 4:
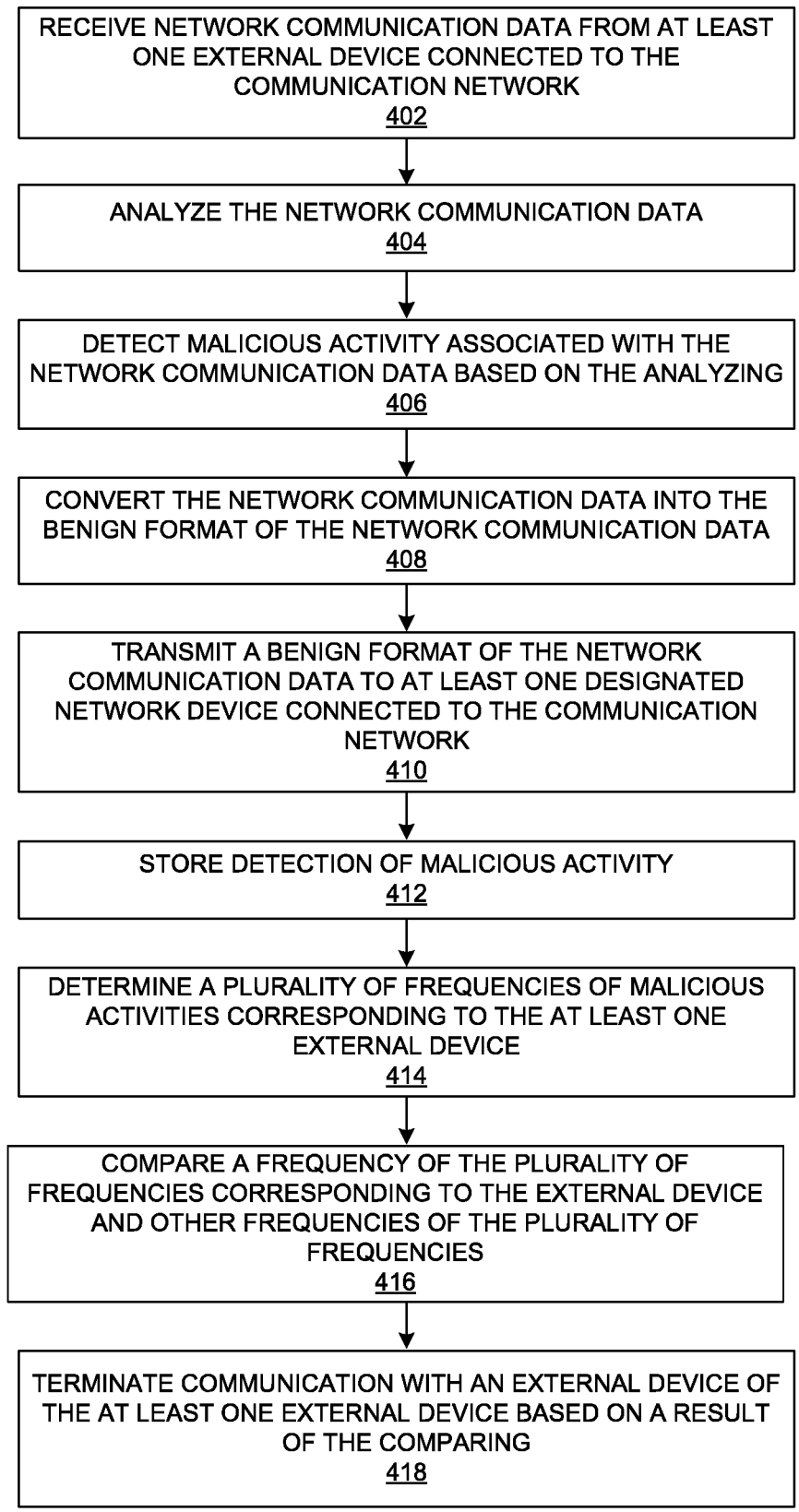
FIG. 4 illustrates a method of processing network communication data in accordance with some embodiments disclosed herein.

FIG. 4 illustrates a method of processing network communication data performable by the embedded device 110 in accordance with some embodiments disclosed herein. The method may include a step 402 of receiving, using the communication interface 112, the network communication data from the one or more external devices, such as external device 108, connected to the communication network, such as network 106. Further, the method may include a step 404 of analyzing, using the processor 114, the network communication data. Further, the method may include a step 406 of detecting, using the processor 114, malicious activity associated with the network communication data based on the analyzing. Further, the method may include a step 408 of converting, using the processor 114, the network communication data into the benign format of the network communication data. Further, the method may include a step 410 of transmitting, using the communication interface 112, a benign format of the network communication data to at least one designated network device, such as network device 118, connected to the communication network and/or the embedded device 110.

Additionally, the method may include a step 412 of storing, using the memory 116, the detection of malicious activity. Further, the method may include a step 414 of determining, using the processor 114, a plurality of frequencies of malicious activities corresponding to the one or more external devices. Additionally, the method may include a step 416 of comparing, using the processor 114, a frequency of the plurality of frequencies corresponding to an external device and other frequencies of the plurality of frequencies. Further, the method may include a step 418 of terminating, using the communication interface 112, communication with an external device of the one or more external devices based on a result of the comparing.

In some embodiments, the terminating of communication with the external device may be performed for a variable duration of time. Further, in some embodiments, the variable duration of time may be based on a random number. Further, in some embodiments, the variable duration of time may range between a lower limit and an upper limit. Furthermore, one or more of the lower limit and the upper limit may be based on the random number. Accordingly, the method may further include a step of generating, using the processor 114, the random number.

In some embodiments, the variable duration of time may be based on the frequency of malicious activity.

Exemplary Embodiments

According to an exemplary embodiment of the present disclosure, monitoring of embedded communications and systems activity, which specifically involves all communications and the monitoring of all data transmitting to/from the embedded device 110 may be performed. Accordingly, extracting (capturing) the IPv4 or IPv6 communications data from the active process buffers (sockets), which reside in memory, such as memory 116, may be performed. Subsequently, converting all data including the payload into a benign (harmless) hexadecimal format may be performed instantaneously. Further, an instantaneous automated analysis on all data including the payload may be conducted and all analyzed data may be instantly transmitted to a designated network device.

Accordingly, in an instance, the present disclosure provides a method of designing C/C++ communications and systems programs within an embedded device, such as embedded device 110, which takes into account each of the specific problems previously identified.

Designing C/C++ programs on an embedded device, such as embedded device 110, that resolve the specific problems, may be configured to automatically monitor, intercept and extract all IPv4 or IPv6 communications data from executing process buffers/sockets (memory), convert all data including the payload into a benign hexadecimal format, instantly and automatically perform an analysis on the data and transmit the data to a designated device, without being detected as a defense Internet sensor, honeypot or sinkhole technology.

Accordingly, the embedded device, such as embedded device 110, may be deployed (installed) on the outside of a network, such as network 106, not within the main network traffic ingress, but parallel to the firewall/network defense systems. Further, the embedded device may have all 65,535 ports enabled and may appear to be a standard network device similar to all network servers. Accordingly, the embedded device may include processes active on numerous ports and processes can be added and assigned to additional ports at any time. Further, the embedded device may detect attacks from attack tools/hackers searching for targets of opportunity attempting to circumvent (bypass) network defense static assets. Accordingly, the embedded device communicates to the source IP address of all attacks defeating the algorithms published to determine an Internet Sensor.

Further, the embedded device may be configured to be identified by attackers (sources) as a real computer. Additionally, the embedded device may be configured for detecting and analyzing all communications data, including all sources attempting to gain unauthorized access through remote access login entry points. Further, the embedded device may be configured to be remotely managed on several ports exactly as a Programmable Logic Controller (PLC) is configured, and can successfully detect and analyze attacks on industrial control system PLCs. Further, the embedded device may be configured to capture all communications data, instantly convert the payload into a benign hexadecimal format, perform an analysis on the cyber attack, and instantly transmit the communications data, including the hexadecimal payload to a designated device.

Further, according to some embodiments, the embedded device may include each of a Cyber Attack Monitor, a Firewall Comm Analyzer and an Instant Messenger. The Cyber Attack Monitor may be bound to the communication sockets and may be configured for extracting all communications from the active process buffers (memory). As the communications is being extracted, all data (relevant to IPv4 or IPv6) may be analyzed and the payload may be instantly converted to a benign hexadecimal format, identifying the protocol and labeling the communications as "H:" (header) and "P:" payload.

The data may be then passed to the Firewall Comm Analyzer. The Firewall Comm Analyzer may be configured to perform an instantaneous analysis on all communications data transmitting from/to the sources IP addresses of those sites (sources) attacking the embedded device.

All communications (each hexadecimal value) are read and analyzed by the Firewall Comm Analyzer, and all communications are allowed to continue with attacking sites (sources) until as much detailed information as possible can be captured from an attacking site (source). Once the Firewall Com Analyzer determines it has as much information as possible about the specific cyber attack, it may execute an automated policy with a variable time length that terminates the connection from the attacking site (source IP address).

The Firewall Comm Analyzer may execute an algorithm with variables based on the frequency of attacks from the specific site (source IP), along with frequency of ongoing attacks from all other sites (source IPs).

The Firewall Comm Analyzer may terminate all communications within a variable time frame, based on the frequency the specific site that has been attacking, in relationship to the frequency that all other cyber attacks are being executed. Based on this variable equation, the time for terminating all communications from an attack site (source IP), could range from 0.01 seconds to a maximum variable set by a random number generator between 0.01 seconds and a defined maximum time. The defined maximum time is also a variable, which changes based on a random number generator that chooses within a series of defined numbers.

Accordingly, the Firewall Comm Analyzer may enable the embedded device to successfully communicate to all attacking sources (IP addresses) and appear to be a normal network device. Accordingly, the embedded device may not be detected as an Internet Sensor or as a virtual computer. Further, the embedded device may be configured to detect those cyber attacks attempting to gain unauthorized access via legitimate remote access "Login" entry points. Additionally, the embedded device may be configured to detect remote access attacks on industrial control systems (PLCs) and terminate the connection of all attacks for a variable length of time, then allow the attacking sites (source IP) to execute another attack.

The cycle continuously repeats itself appearing as a normal network device communicating with the attacking sites (source IPs) never being discovered as an embedded device, while automatically extracting all communications data from the process buffers/sockets (memory), automatically analyzing the hexadecimal payload and instantly transmitting all cyber attack data to a designated device.

All of the analyzed communications data is passed from the Firewall Comm Analyzer to the Instant Messenger. Further, the Instant Messenger may encrypt the data and transmit all data to the designated device located at a customer site.

Figure 5:
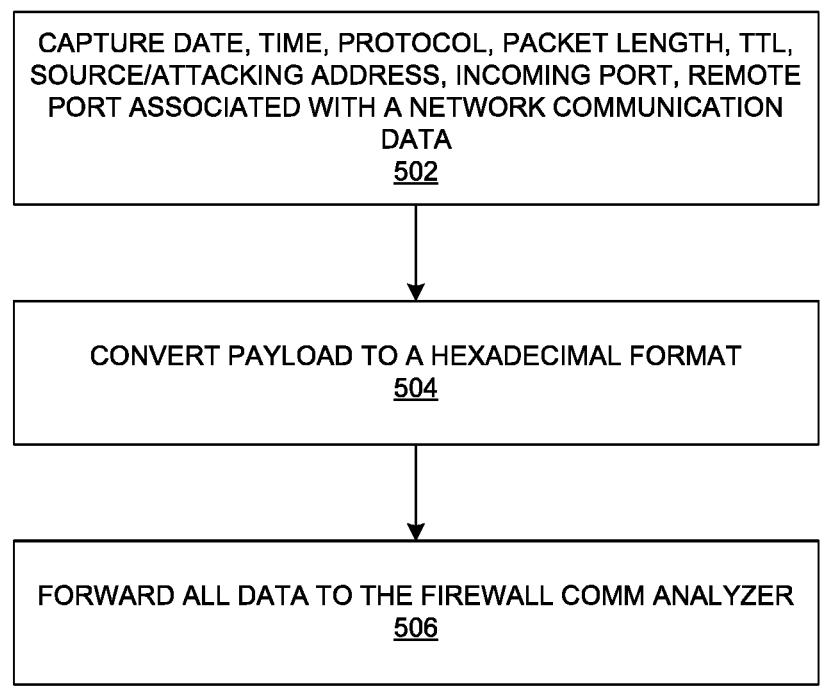
FIG. 5 illustrates a method of processing network communication data performable by the embedded device in accordance with an exemplary embodiment.

Referring now to FIG. 5, illustrated is a flow diagram of a method performable by the Cyber Attack Monitor. At step 502, the Cyber Attack Monitor may extract all communications data from the process buffers/sockets (memory) and retrieves all information relevant to IPv4 or IPv6 transmissions. Such communication may include, for example, Date, Time, Protocol, Packet Length, TTL, Source/Attacking Address, Incoming Port and Remote Port associated with the network communication data. Further, at step 504, the captured IPv4 or IPv6 data may be broken down and then the payload may be extracted, and depending on the protocol each data transmission will be labeled "H:" for header information (data) or "P:" for payload information (data). Further, the payload may be converted to hexadecimal format.

Furthermore, at step 506, the data may be instantaneously processed and delivered to the Firewall Comm Analyzer.

Figure 6:
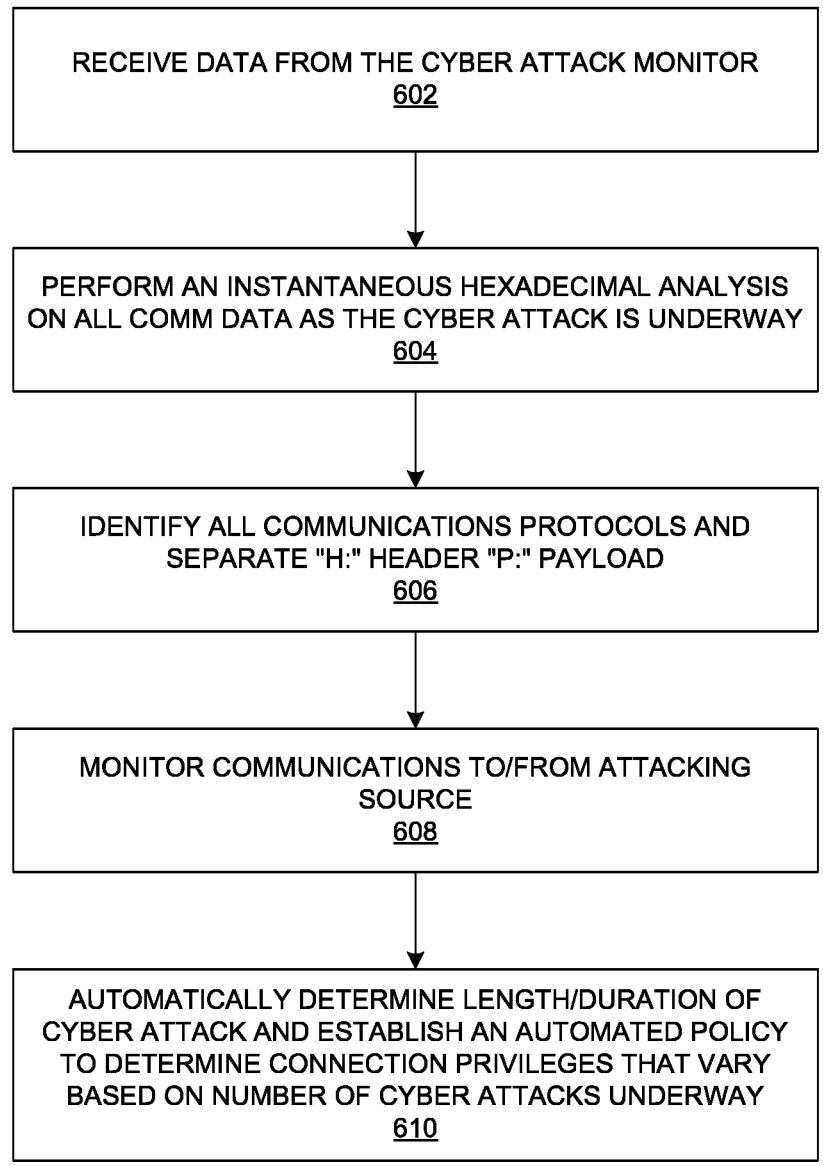
FIG. 6 illustrates a method of processing network communication data associated with a cyber attack based on characteristics, such as frequency and duration of the cyber attack in accordance with an exemplary embodiment.

Referring now to FIG. 6, illustrated is a flow diagram of a method performable by Firewall Comm Analyzer. At step 602, the communications data (hexadecimal format) may be passed from the Cyber Attack Monitor to the Firewall Comm Analyzer. Subsequently, at step 604, the Firewall Comm Analyzer may perform an instantaneous analysis on all communications data transmitting from/to the sources IP addresses of those sites (sources) attacking the embedded device.

At step 606, the Firewall Comm Analyzer the header and payload portion of the communication data may be identified. Further, at step 608, all communications (each hexadecimal value) may be read and analyzed by the Firewall Comm Analyzer, and all communications are allowed to continue with attacking sites (sources) until as much detailed information as possible can be captured from an attacking site (source). Once the Firewall Com Analyzer determines it has as much information as possible about the specific cyber attack, it executes an automated policy with a variable time length that terminates the connection from the attacking site (source IP address).

The Firewall Comm Analyzer executes an algorithm with variables based on the frequency of attacks from the specific site (source IP), along with frequency of ongoing attacks from all other sites (source IPs).

At step, 610, the Firewall Comm Analyzer may terminate all communications within a variable time frame, based on the frequency the specific site that has been attacking, in relationship to the frequency all other cyber attacks are being executed. Based on this variable equation, which the time terminating all communications from an attack site (source IP), could range from 0.01 seconds to a maximum variable set by a random number generator between 0.01 seconds and a defined maximum time.

The defined maximum time is also a variable, which changes based on a random number generator that chooses within a series of defined numbers. The Firewall Comm Analyzer equation allows the embedded device to successfully communicate to all attacking sources (IP addresses) and appear to be a normal network device, cannot be detected as an Internet Sensor, is not perceived as a virtual computer, is configured to detect those cyber attacks attempting to gain unauthorized access via legitimate remote access "Login" entry points, is configured to detect remote access attacks on industrial control systems (PLCs), will terminate the connection of all attacks for a variable length of time, then allow the attacking sites (source IP) to execute another attack.

The cycle continuously repeats itself appearing as a normal network device communicating with the attacking sites (source IPs) never being discovered as an embedded device automatically extracting all communications data from the process buffers/sockets (memory), automatically analyzing the hexadecimal payload and instantly transmitting all cyber attack data to a defined (customer) device.

Figure 7:
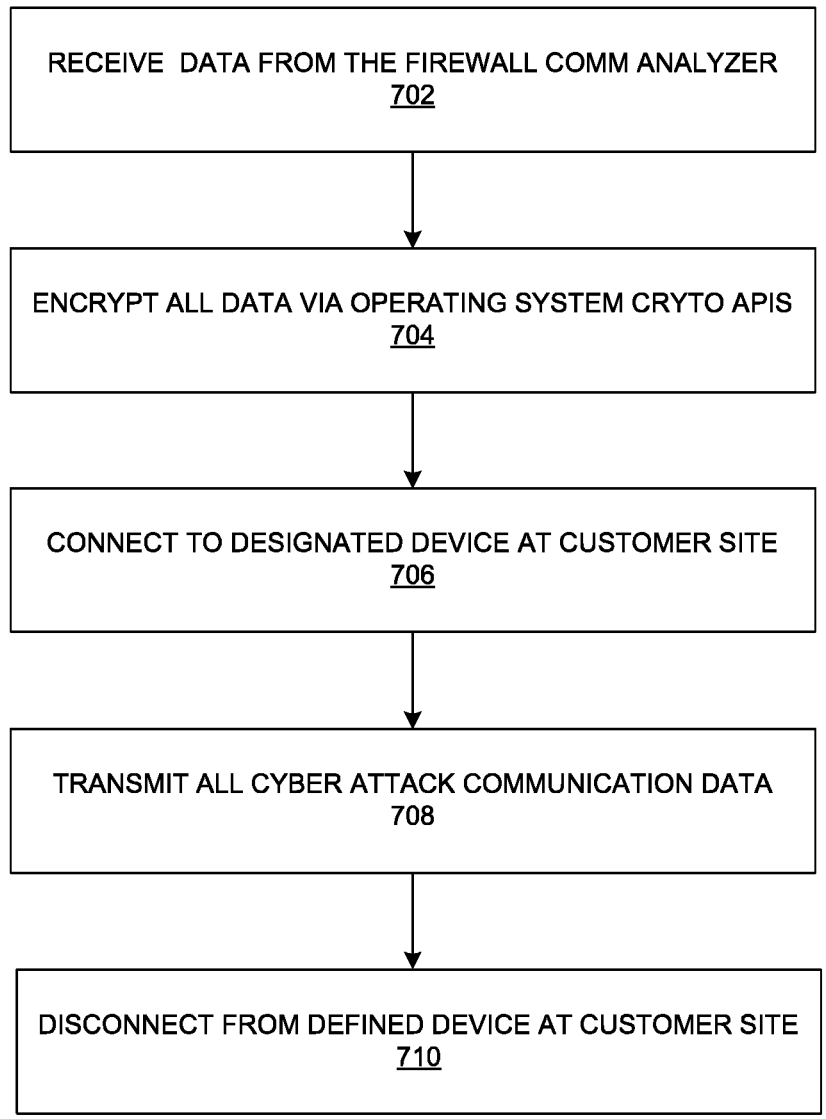
FIG. 7 illustrates a method of processing network communication data associated with a cyber attack in accordance with another exemplary embodiment.

Referring now to FIG. 7, illustrated is a flow diagram of a method performable by the Instant Messenger. At step 702, the Instant Messenger may receive all data from the Firewall Comm Analyzer. Further, at step 704, the Instant Messenger may encrypt all data via the NIAP certified crypto APIs installed within the 32-bit or 64-bit O/S. Subsequently, at step 706, the Instant Messenger may connect to a designated device at a customer site and at step 708, may transmit the cyber attack data, which includes the benign hexadecimal payload of the cyber attack. Finally, at step 710, the Instant Messenger may disconnect from the designated device at the customer site, and waits for the next cyber attack. The cycle may repeat itself 24×7, 7 days a week, 365 days per year.

Although the invention has been explained in relation to its preferred embodiment, it is understood that many other possible modifications and variations can be made without departing from the spirit and scope of the invention as herein described.

I claim:

1. An embedded device configured to process a network communication data received over a communication network, the embedded device comprising:
   a communication interface;
   a memory;
   a processor;
   the communication interface being configured to receive the network communication data from at least one external device connected to the communication network;
   said embedded device configured as an alternative entry point for network traffic ingress to a pre-established network and installed in a peripheral position exterior to said pre-established network;
   said embedded device configured to detect attacks from sources external to said pre-established network attempting entry into the network through said alternative entry point;
   said embedded device capturing all communications data at said communication interface prior to entry into any network ingress point for said pre-established network and converting all of said captured communications data to a benign data format;
   said embedded device processor performing an analysis of said captured communications data upon conversion to said benign data format;
   the embedded device configured to transmit said benign data format and an analysis of the captured network communication data to at least one designated authority or user of the pre-established network; and
   where the captured communications data from said detected attacks is converted to a benign format in said memory of the embedded device prior to any transmission of said communications data to any firewall or network defense system associated with said pre-established network.

2. The embedded device of claim 1, wherein the communication interface comprises a plurality of communication ports, wherein each of the plurality of communication ports is set to an enabled state and at least one communication port is configured to appear as a remote management port.

3. The embedded device of claim 1, wherein the communication interface comprises a plurality of communication ports, wherein at least one communication port of the plurality of communication ports is configured to appear as a remote management port associated with a Programmable Logic Controller (PLC).

4. The embedded device of claim 1, where the communication interface is configured to terminate communication with the external device for a variable duration of time.

5. The embedded device of claim 1, where the benign format comprises hexadecimal format.

6. The embedded device of claim 1, where said embedded device further comprises a Cyber Attack Monitor module, a Firewall Comm Analyzer module, and an Instant Messenger module.

7. The embedded device of claim 6, where said Cyber Attack Monitor is bound to one or more communication sockets associated with said pre-established network and is configured to extract all communications data from said memory of the embedded device for immediate analysis.

8. The embedded device of claim 7, where said Firewall Comm Analyzer is configured to perform said immediate analysis of communications data transmitted from or to source Internet Protocol (IP) addresses of each external source associated with an attack on said pre-established network.

9. The embedded device of claim 6, where said Firewall Comm Analyzer is configured to terminate all communications with an attacking external source or device for a variable duration of time based upon the frequency of malicious activity.

10. The embedded device of claim 6, where said Instant Messenger is configured to encrypt all captured communication data and data analysis to a designated device located at a customer site and associated with a particular authority or user.

11. A method of processing a network communication data received over a communication network using an embedded device, the method comprising:
configuring said embedded device as an alternative entry point for network traffic ingress to a pre-established network and installed in a peripheral position exterior to said pre-established network, said embedded device configured to defend the network asset against a malicious network communication;
receiving, using a communication interface, the network communication data from at least one external device connected to the pre-established network;
said embedded device detecting malicious network communication attacks from sources external to said pre-established network attempting entry into the network through said alternative entry point;
said embedded device capturing all communications data at said communication interface prior to entry into any network ingress point for said pre-established network and converting said captured communications data to a benign data format;
analyzing, using a processor, the captured network communication data upon conversion to said benign data format;
detecting, using the processor, malicious activity associated with the network communication data based on the analyzing;
transmitting from said embedded device, the benign data format of the network communication data to at least one designated network device connected to the communication network; and
transmitting from said embedded device a benign data format and an analysis of the captured network communication data to at least one designated authority or user of the pre-established network.

12. The method of claim 11, wherein the communication interface comprises a plurality of communication ports, wherein the method further comprises setting each of the plurality of communication ports to an enabled state.

13. The method of claim 11, wherein the communication interface comprises a plurality of communication ports, the method further comprising configuring at least one communication port of the plurality of communication ports to appear as a remote management port associated with a Programmable Logic Controller (PLC).

14. The method of claim 11, where the terminating of communication with the external device is performed for a variable duration of time.

15. The method of claim 11, where the benign format comprises hexadecimal format.

16. The method of claim 11, where said embedded device further comprises a Cyber Attack Monitor module, a Firewall Comm Analyzer module, and an Instant Messenger module.

17. The method of claim 16, where said Cyber Attack Monitor is bound to one or more communication sockets associated with said pre-established network and is configured to extract all communications data from said memory of the embedded device for immediate analysis.

18. The method of claim 17, where said Firewall Comm Analyzer is configured to perform said immediate analysis of communications data transmitted from or to source Internet Protocol (IP) addresses of each external source associated with an attack on said pre-established network.

19. The method of claim 16, where said Firewall Comm Analyzer is configured to terminate all communications with an attacking external source or device for a variable duration of time based upon the frequency of malicious activity.

20. The method of claim 16, where said Instant Messenger is configured to encrypt all captured communication data and data analysis to a designated device located at a customer site and associated with a particular authority or user.

* * * * *